(12) United States Patent
Wu et al.

(10) Patent No.: US 10,498,146 B2
(45) Date of Patent: Dec. 3, 2019

(54) CHARGING DEVICE, SYSTEM AND METHOD

(71) Applicant: GENERAL ELECTRIC COMPANY, Schenectady, NY (US)

(72) Inventors: Tao Wu, ShangHai (CN); Fei Li, ShangHai (CN); Pengcheng Zhu, ShangHai (CN); Changjin Liu, ShangHai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/473,754

(22) Filed: Mar. 30, 2017

(65) Prior Publication Data
US 2017/0288423 A1 Oct. 5, 2017

(30) Foreign Application Priority Data
Mar. 30, 2016 (CN) .......................... 2016 1 0192001

(51) Int. Cl.
*H02J 7/00* (2006.01)
(52) U.S. Cl.
CPC ............ *H02J 7/0019* (2013.01); *H02J 7/007* (2013.01); *H02J 7/0013* (2013.01)
(58) Field of Classification Search
CPC ......... H02J 7/0019; H02J 7/007; H02J 7/0013
(Continued)

(56) References Cited

U.S. PATENT DOCUMENTS 3,928,791 A * 12/1975 Mullersman .......... H02J 7/0026
320/119
3,930,192 A * 12/1975 Dinkler .................... H02J 7/34
307/66
(Continued)

FOREIGN PATENT DOCUMENTS

CN 101752624 A 6/2010
CN 102055210 A 5/2011
(Continued)

OTHER PUBLICATIONS

"Webster's Encyclopedic Unabridged Dictionary of the English Language," PHR Press, Random House Value Publishing Inc., Deluxe Edition, New York, New York, Published 2001 (ISBN 0-517-21921-2; citations refer to pp. 1292, 1325, & 1747).*

(Continued)

*Primary Examiner* — Robert Grant
*Assistant Examiner* — John T Trischler
(74) *Attorney, Agent, or Firm* — Meagher Emanuel Laks Goldberg & Liao, LLP

(57) ABSTRACT

A charging device for charging a battery pack includes a plurality of charging assemblies for charging a plurality of battery cells connected electrically in series, wherein the plurality of charging assemblies are configured to charge a first set of the plurality of battery cells in a first time period and a second set of the plurality of battery cells in a second time period, any two of the plurality of battery cells that neighbor with each other are from different sets of the plurality of battery cells, and each of the plurality of charging assemblies comprises: an AC/DC converter for converting an inputted AC voltage to a first DC voltage; and a DC/DC converter for converting the first DC voltage to a second DC voltage for charging the battery cell.

19 Claims, 9 Drawing Sheets

US 10,498,146 B2

Page 2

(58) Field of Classification Search
USPC .................................................... 320/112
See application file for complete search history.

(56) References Cited

U.S. PATENT DOCUMENTS

| | | | | |
|---|---|---|---|---|
| 4,639,655 A * | 1/1987 | Westhaver | ............ | H02J 7/0024 320/124 |
| 5,488,282 A * | 1/1996 | Hayden | ................ | B64G 1/425 136/293 |
| 5,525,888 A * | 6/1996 | Toya | .................. | H01M 2/1022 320/110 |
| 5,617,004 A * | 4/1997 | Kaneko | ............. | H01M 10/441 320/119 |
| 5,666,006 A * | 9/1997 | Townsley | ............ | H02J 7/0024 307/43 |
| 5,684,386 A * | 11/1997 | Okada | .................. | H01M 10/44 320/139 |
| 5,701,597 A * | 12/1997 | Nakanishi | ............ | H02J 7/0024 455/127.1 |
| 5,726,551 A * | 3/1998 | Miyazaki | ........... | B60L 11/1803 320/104 |
| 5,734,253 A * | 3/1998 | Brake | ................... | H02J 7/0027 320/125 |
| 5,780,991 A * | 7/1998 | Brake | ................ | H01M 10/441 320/106 |
| 5,821,729 A * | 10/1998 | Schmidt | ............... | H02J 7/0018 320/126 |
| 5,982,143 A * | 11/1999 | Stuart | ................ | H01M 10/441 320/119 |
| 6,181,106 B1 * | 1/2001 | Finger | .................. | H02J 7/0019 320/119 |
| 6,288,521 B1 * | 9/2001 | Meador | ................ | H02J 7/0019 320/118 |
| 6,297,616 B1 * | 10/2001 | Kubo | ................... | H02J 7/0027 320/116 |
| 6,462,511 B1 * | 10/2002 | Kwok | ................. | H02J 7/0024 320/119 |
| 6,624,612 B1 * | 9/2003 | Lundquist | ......... | H01M 10/4207 320/118 |
| 6,664,762 B2 * | 12/2003 | Kutkut | .................. | H02J 7/022 320/116 |
| 6,741,065 B1 * | 5/2004 | Ishii | .................. | B60L 11/1816 320/122 |
| 6,771,044 B1 * | 8/2004 | Vinciguerra | ............ | H02J 9/061 320/116 |
| 7,135,836 B2 * | 11/2006 | Kutkut | .................. | H02J 7/022 320/116 |
| 7,642,748 B2 * | 1/2010 | Glosser, Jr. | ............ | H02J 7/0018 320/116 |
| 7,642,749 B2 * | 1/2010 | Nishida | ................ | H02J 7/0024 320/107 |
| 7,880,334 B2 | 2/2011 | Evans et al. | | |
| 8,008,890 B2 * | 8/2011 | Lee | ....................... | H02J 7/0018 320/118 |
| 8,120,322 B2 * | 2/2012 | Lee | ....................... | H02J 7/0016 320/118 |
| 8,232,767 B2 * | 7/2012 | Oh | ..................... | G01R 31/3658 320/116 |
| 8,330,418 B2 * | 12/2012 | Furukawa | ............. | H02J 7/0018 320/118 |
| 8,427,083 B2 * | 4/2013 | Warmenhoven | ....... | H02K 53/00 180/165 |
| 8,450,973 B2 * | 5/2013 | Ho | ....................... | H02J 7/0019 320/119 |
| 8,536,833 B2 * | 9/2013 | Ohnuki | ................ | H02J 7/0018 320/119 |
| 8,541,979 B2 * | 9/2013 | Firehammer | ......... | H02J 7/0014 320/107 |
| 8,564,247 B2 * | 10/2013 | Hintz | ................... | H02J 7/0016 320/117 |
| 8,594,873 B2 * | 11/2013 | Kimura | ................ | B60L 11/1811 318/139 |
| 8,659,182 B2 * | 2/2014 | Ichikawa | ............ | B60L 11/1861 307/10.1 |
| 8,674,658 B2 * | 3/2014 | Wang | .................. | H01M 10/441 320/117 |
| 8,686,693 B2 * | 4/2014 | Bhowmik | ............. | H02J 7/0014 320/134 |
| 8,970,179 B2 * | 3/2015 | Zhong | ................. | H01M 10/441 320/139 |
| 9,236,755 B2 * | 1/2016 | Chang | ................. | B60L 11/1816 |
| 9,281,906 B2 * | 3/2016 | Choudhury | ............. | H04B 13/02 |
| 9,300,148 B2 * | 3/2016 | Oh | ......................... | H02J 7/0022 |
| 9,318,779 B2 * | 4/2016 | Uno | ........................ | H01M 10/44 |
| 9,318,958 B2 * | 4/2016 | Sagneri | ................ | H02M 3/335 |
| 9,496,735 B2 * | 11/2016 | Sarkar | ................. | B60L 11/1809 |
| 9,649,923 B2 * | 5/2017 | Perlo | ......................... | B60K 1/00 |
| 9,692,244 B2 * | 6/2017 | Lee | ......................... | H02J 7/0068 |
| 9,800,074 B2 * | 10/2017 | Adames | ................ | H02J 7/007 |
| 9,882,422 B2 * | 1/2018 | Mondal | ..................... | H02J 1/10 |
| 9,885,757 B2 * | 2/2018 | Liu | .......................... | G01R 31/362 |
| 9,899,843 B2 * | 2/2018 | Li | ............................. | H02J 3/383 |
| 9,908,421 B2 * | 3/2018 | Koolen | ............... | B60L 11/1844 |
| 9,948,115 B2 * | 4/2018 | Ivanov | ................. | H02J 7/0014 |
| 9,960,676 B1 * | 5/2018 | Symonds | ................ | H02M 3/156 |
| 9,991,726 B2 * | 6/2018 | Small, Jr. | ............... | H02J 7/0021 |
| 10,263,435 B2 * | 4/2019 | Kim | ....................... | H02J 7/0018 |
| 2003/0038612 A1 * | 2/2003 | Kutkut | .................... | H02J 7/022 320/140 |
| 2004/0189250 A1 * | 9/2004 | Nishida | ................. | H02J 7/0024 320/116 |
| 2004/0189251 A1 * | 9/2004 | Kutkut | .................... | H02J 7/022 320/128 |
| 2006/0088743 A1 * | 4/2006 | Gallagher | ......... | H01M 8/04097 429/431 |
| 2007/0090797 A1 * | 4/2007 | Glosser, Jr. | ........... | H02J 7/0018 320/116 |
| 2007/0122692 A1 * | 5/2007 | Smith | ................. | H01M 2/0202 429/87 |
| 2008/0067869 A1 * | 3/2008 | Evans | ..................... | H02J 3/387 307/11 |
| 2008/0191663 A1 * | 8/2008 | Fowler | .................. | B60L 11/185 320/118 |
| 2008/0290877 A1 * | 11/2008 | Oh | ..................... | G01R 31/3658 324/426 |
| 2010/0181829 A1 * | 7/2010 | Ichikawa | ............ | B60L 11/1861 307/9.1 |
| 2010/0192362 A1 | 8/2010 | Yoon et al. | | |
| 2010/0231167 A1 * | 9/2010 | Ohnuki | ................ | H02J 7/0018 320/119 |
| 2011/0101916 A1 * | 5/2011 | Densham | ............. | H02J 7/0018 320/116 |
| 2011/0175575 A1 * | 7/2011 | Wu | ..................... | G01R 31/3627 320/128 |
| 2011/0193525 A1 * | 8/2011 | Ro | ......................... | H02J 7/0016 320/116 |
| 2011/0193527 A1 * | 8/2011 | Ho | ......................... | H02J 7/0019 320/128 |
| 2011/0234164 A1 * | 9/2011 | Furukawa | ............. | H02J 7/0018 320/118 |
| 2011/0282807 A1 * | 11/2011 | Colello | .................. | G06Q 50/06 705/412 |
| 2011/0309795 A1 * | 12/2011 | Firehammer | ......... | H02J 7/0014 320/118 |
| 2011/0309796 A1 * | 12/2011 | Firehammer | ......... | H02J 7/0018 320/118 |
| 2012/0043945 A1 * | 2/2012 | Kim | ....................... | H02J 7/0014 320/167 |
| 2012/0146588 A1 * | 6/2012 | Ishibashi | ............ | H02J 7/0018 320/138 |
| 2012/0187920 A1 * | 7/2012 | Zhong | ................. | H01M 10/441 320/139 |
| 2012/0194138 A1 * | 8/2012 | Uno | ........................ | H01M 10/44 320/119 |
| 2012/0274331 A1 * | 11/2012 | Liu | .......................... | G01R 31/362 324/426 |
| 2012/0299533 A1 * | 11/2012 | Huffman | ............. | H02J 7/0013 320/107 |

(56) References Cited

U.S. PATENT DOCUMENTS

| | | | | |
|---|---|---|---|---|
| 2013/0020989 A1* | 1/2013 | Xia | H02M 7/2176 | 320/109 |
| 2013/0044002 A1* | 2/2013 | Schneider | H01M 10/441 | 340/636.2 |
| 2013/0169212 A1* | 7/2013 | Sun | H02M 3/33592 | 320/103 |
| 2013/0229153 A1 | 9/2013 | Sarkar et al. | | |
| 2013/0307486 A1* | 11/2013 | Chang | B60L 11/1812 | 320/137 |
| 2013/0320919 A1* | 12/2013 | Adames | H02J 7/007 | 320/107 |
| 2014/0009092 A1* | 1/2014 | Ma | B60L 11/1866 | 318/139 |
| 2014/0009117 A1* | 1/2014 | Ishii | H02J 7/34 | 320/126 |
| 2014/0184421 A1* | 7/2014 | Choudhury | H04B 13/02 | 340/850 |
| 2014/0232346 A1 | 8/2014 | Zhang et al. | | |
| 2014/0266061 A1* | 9/2014 | Wachal | H02J 7/0068 | 320/134 |
| 2014/0361732 A1* | 12/2014 | Nishikawa | H02J 7/0014 | 320/107 |
| 2015/0008879 A1* | 1/2015 | Schneider | H02J 7/0024 | 320/110 |
| 2015/0022140 A1* | 1/2015 | Heishi | H02J 7/34 | 320/101 |
| 2015/0194842 A1* | 7/2015 | Mondal | H02J 1/10 | 307/23 |
| 2015/0357684 A1* | 12/2015 | Willgert | H01M 10/46 | 320/112 |
| 2016/0028303 A1* | 1/2016 | Chataignere | H02M 1/36 | 320/107 |
| 2016/0049811 A1* | 2/2016 | Ivanov | H02J 7/0014 | 320/112 |
| 2016/0204624 A1* | 7/2016 | Small, Jr. | H02J 7/0021 | 320/139 |
| 2016/0204625 A1* | 7/2016 | Josephs | H02J 7/007 | 320/139 |
| 2016/0294182 A1* | 10/2016 | Li | H02J 1/00 | |
| 2016/0294190 A1* | 10/2016 | Li | H02J 3/383 | |
| 2016/0294304 A1* | 10/2016 | Li | B60L 1/006 | |
| 2016/0347159 A1* | 12/2016 | Perlo | B60K 1/00 | |
| 2017/0070072 A1* | 3/2017 | Lee | H02J 7/0068 | |
| 2017/0077746 A1* | 3/2017 | Kanakasabai | H02J 9/061 | |
| 2017/0214253 A1* | 7/2017 | Kim | H02J 7/0018 | |
| 2018/0167028 A1* | 6/2018 | Agarwal | H02S 40/38 | |
| 2019/0044348 A1* | 2/2019 | Maruyama | H02J 7/0091 | |

FOREIGN PATENT DOCUMENTS

| | | |
|---|---|---|
| CN | 203119557 U | 8/2013 |
| WO | 2013/042216 A1 | 3/2013 |

OTHER PUBLICATIONS

Christen, D., et al., "Ultra-Fast Charging Station for Electric Vehicles with integrated split Grid Storage," 17th European Conference on Power Electronics and Applications, pp. 11 (Sep. 8-10, 2015).

Vasiladiotis, M., and Rufer, A., "A Modular Multiport Power Electronic Transformer With Integrated Split Battery Energy Storage for Versatile Ultrafast EV Charging Stations," IEEE Transactions on Industrial Electronics, vol. 62, Issue. 5, pp. 3213-3222 (May 2015).

* cited by examiner

CHARGING DEVICE, SYSTEM AND METHOD

TECHNOLOGY FIELD

Embodiments of the present invention relate to the field of electricity storage, and more particularly to a charging device, system and method.

BACKGROUND

Due to the limited supply capacity of a single battery, a plurality of batteries are typically assembled into a battery pack to provide sufficient power when a high power supply is required. However, there is an inevitably difference between parameters such as internal resistances, capacities, self-discharge rates of battery cells in the battery pack due to multiple factors such as a manufacturing accuracy, a process control, etc. This difference will lead to a charging and discharging imbalance of the entire battery pack.

To solve the abovementioned problem, the prior art has provided various solutions. For example, before charging, all the battery cells are discharged to reduce the difference between the battery cells. However, this solution not only leads to complex circuits and higher costs, but also fails to essentially solve the charging and discharging imbalance caused by the difference between parameters of the battery cells.

Therefore, it is necessary to provide a new charging device and system to resolve at least one of the abovementioned problems.

BRIEF DESCRIPTION

The present disclosure provides a charging device, system and method.

In one aspect, the present disclosure relates to a charging device for charging a battery pack, comprising: a plurality of charging assemblies for charging a plurality of battery cells connected electrically in series in the battery pack, wherein the plurality of charging assemblies are configured to charge a first set of the plurality of battery cells in a first time period and a second set of the plurality of battery cells in a second time period, any two of the plurality of battery cells that neighbor with each other are from different sets of the plurality of battery cells, and each of the plurality of charging assemblies comprises: an AC/DC converter for converting an inputted AC voltage to a first DC voltage; and a DC/DC converter for converting the first DC voltage to a second DC voltage for charging the battery cell.

In another aspect, the present disclosure relates to a charging system, comprising: a battery pack comprising a plurality of battery cells connected electrically in series; and a charging device comprising a plurality of charging assemblies for charging the plurality of battery cells, each of the plurality of charging assemblies comprising: an AC/DC converter for converting an inputted AC voltage to a first DC voltage; a DC/DC converter for converting the first DC voltage to a second DC voltage for charging the battery cell; wherein the plurality of charging assemblies charge a first set of the plurality of battery cells in a first time period and a second set of the plurality of battery cells in a second time period, and any two of the plurality of battery cells that neighbor with each other are from different sets of the plurality of battery cells.

In a further aspect, the present disclosure relates to a charging method for charging a battery pack, wherein the battery pack comprises a plurality of battery cells connected electrically in series, and the method comprises: charging, in a first time period, a first set of the plurality of battery cells by a first set of charging assemblies; charging, in a second time period, a second set of the plurality of battery cells by a second set of charging assemblies; wherein any two of the plurality of battery cells that neighbor with each other are from different sets of the plurality of battery cells.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
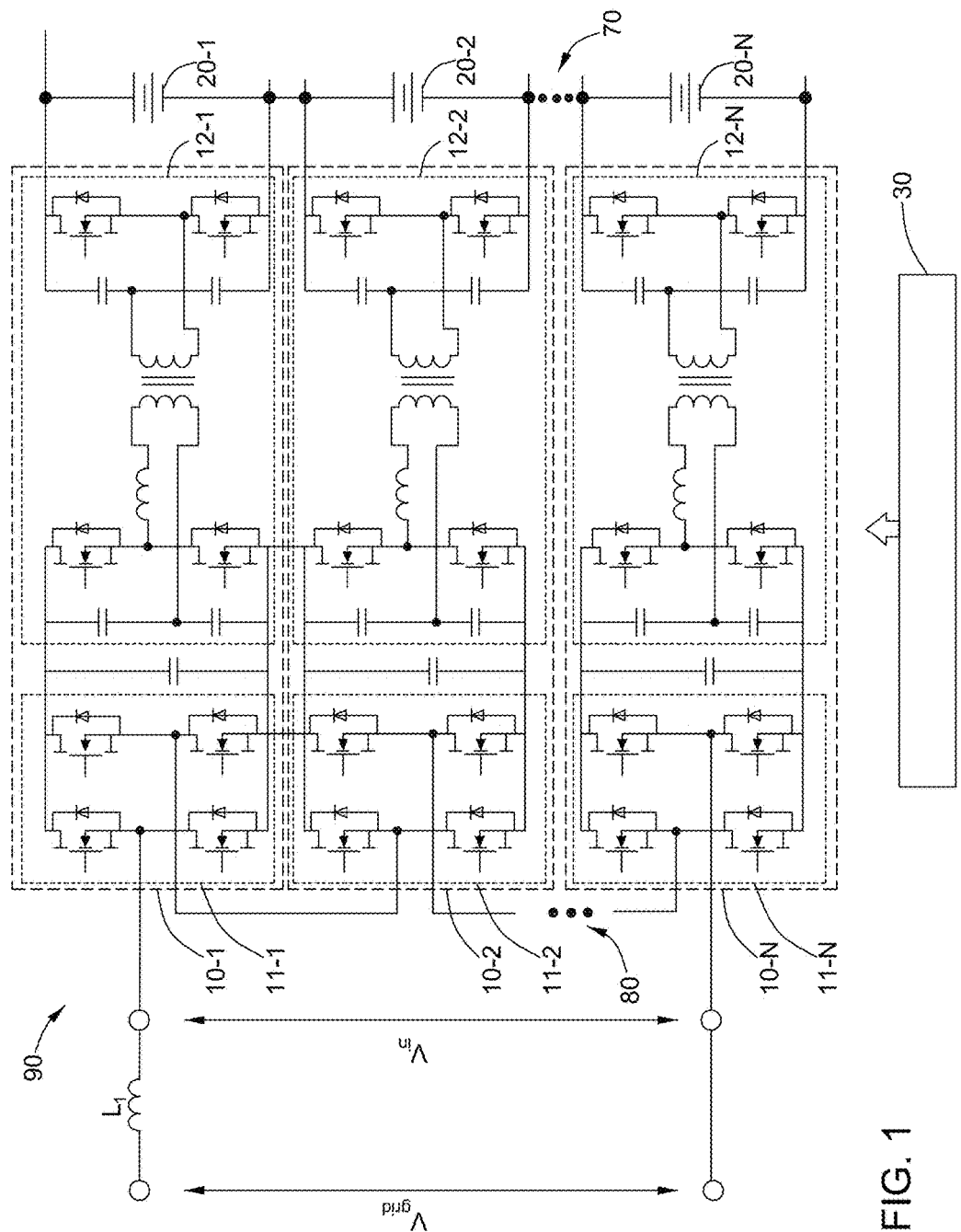
FIG. 1 is a circuit schematic diagram of a charging system in accordance with an embodiment of the present disclosure.

In an effort to provide a concise description of these embodiments, not all features of an actual implementation are described in one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of the present disclosure.

Unless defined otherwise, technical and scientific terms used herein have the same meaning as is commonly understood by one of ordinary skill in the art to which the present disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items.

The term "or" is meant to be inclusive and mean either any, several, or all of the listed items. The use of "including", or "comprising" and variations thereof herein are meant to encompass the items listed thereafter and equivalents thereof as well as additional items.

The reference to "some embodiments" herein mean that a particular element (e.g., feature, structure and/or feature) related to the present invention is included in at least one embodiment mentioned in the present specification, may or may not appear in other embodiments. In addition, it is to be understood that the inventive elements may be combined in any suitable manner.

A charging system of the present disclosure comprises a battery pack and a charging device. The battery pack comprises a plurality of battery cells connected electrically in series. The charging device comprises a plurality of charging assemblies for charging the plurality of battery cells connected electrically in series in the battery pack, wherein the plurality of charging assemblies are configured to charge a first set of the plurality of battery cells in a first time period and to charge a second set of the plurality of battery cells in a second time period, any two of the plurality of battery cells that neighbor with each other are from different sets of the plurality of battery cells, and each charging assembly comprises an AC/DC converter for converting an inputted AC voltage to a first DC voltage and a DC/DC converter for converting the first DC voltage to a second DC voltage for charging the battery cell.

The following describes the embodiments of the present invention with reference to the accompanying drawings, and may not describe in detail functions or structures that are well known, to prevent unnecessary details that may make the present invention hard to understand.

FIG. 1 illustrates a circuit schematic diagram of a charging system 90 in accordance with an embodiment of the present disclosure. The charging system 90 comprises a battery pack 70 and a charging device 80 for charging the battery pack 70.

The battery pack 70 comprises a plurality of battery cells 20-1, 20-2, ..., 20-N connected electrically in series; wherein, N is a natural number. In some embodiments, the battery pack 70 comprises integrated separating batteries. In some embodiments, the battery pack 70 comprises an on-board battery.

The charging device 80 is coupled to a grid to receive an AC voltage $V_{grid}$. In some embodiments, the charging device 80 is coupled to the grid through an inductor $L_1$.

The charging device 80 comprises a plurality of battery assemblies 10-1, 10-2, ..., 10-N, the plurality of battery assemblies 10-1, 10-2, ..., 10-N charge a plurality of battery cells 20-1, 20-2, ..., 20-N connected electrically in series, and the battery assemblies 10-1, 10-2, ..., 10-N are configured so that a first set of the battery cells 20-1, 20-2, ..., 20-N are charged in a first time period and a second set of the battery cells 20-1, 20-2, ..., 20-N are charged in a second time period, wherein any two of the battery cells 20-1, 20-2, ..., 20-N that neighbor with each other are from different sets of the battery cells 20-1, 20-2, ..., 20-N. Therefore, any two of the battery cells 20-1, 20-2, ..., 20-N that neighbor with each other are charged in two different period, i.e., any two of the battery cells 20-1, 20-2, ..., 20-N will not be charged at the same time. In some embodiments, the battery assemblies 10-1, 10-2, ..., 10-N may separately work in a charging mode or a sleeping mode. The battery assemblies in a charging mode provide charging voltage to charge corresponding battery cells; the battery assemblies in a sleeping mode don not provide charging voltage, i.e., the corresponding battery cells are not charged.

In some embodiments, taking an example that N is an even number, the first set of battery cells 20-1, 20-2, ..., 20-N comprises battery cells 20-1, 20-3, ..., 20-(N−1), the second set of battery cells 20-1, 20-2, ..., 20-N comprises battery cells 20-2, 20-4, ..., 20-N.

In the embodiment shown in FIG. 1, there is a one-to-one correspondence between the battery assemblies 10-1, 10-2, ..., 10-N and the battery cells 20-1, 20-2, ..., 20-N, i.e., a charging assembly charges only one battery cell, and a battery cell is charged by only one charging assembly. In some embodiments, the battery assemblies 10-1, 10-3, ..., 10-(N−1) for charging the first set of the battery cells 20-1, 20-3, ..., 20-(N−1) are in the charging mode in the first time period, and are in the sleeping mode in the second time. The battery assemblies 10-2, 10-4, ..., 10-N for charging the second set of the battery cells 20-2 20-4, ..., 20-N are in the sleeping mode in the first time period, and are in the charging mode in the second time.

In some embodiments, the battery cells 20-1, 20-2, ..., 20-N have the same or similar rated charging voltage, the second DC voltages output by the battery assemblies 10-1, 10-2, ..., 10-N are the same or similar. For example, the rated charging voltages of the battery cells 20-1 and 20-3 are the same, then the second DC voltages output by the battery assemblies 10-1 and 10-3 are the same. In some embodiments, the rated charging voltages of at least two of the charging units in the battery cells 20-1, 20-2, ..., 20-N are different, then the second DC voltages output by the charging assemblies in the battery assemblies 10-1, 10-2, ..., 10-N for charging the at least two charging units are different. For example, the rated charging voltages of battery cells 20-1 and 20-3 are different, then the second DC voltages output by charging assemblies 10-1 and 10-3 are different.

It should be noted that the abovementioned "first set" and "second set" are not intended to limitation, and it may be understood in the art that the plurality of battery cells 20-1, 20-2, ..., 20-N may be divided into three sets [20-1, 20-4, ..., 20-(N−2); 20-2, 20-5, ..., 20-(N−1); 20-3, 20-6, ..., 20-N] or more sets to be charged respectively in three or more time periods.

The battery assemblies 10-1, 10-2, ..., 10-N comprise AC/DC converters 11-1, 11-2, ..., 11-N for converting inputted AC voltages to first DC voltages and DC/DC converters 12-1, 12-2, ..., 12-N for converting the first DC voltages generated by the AC/DC converters 11-1, 11-2, ..., 11-N to second DC voltages for charging the battery cells 20-1, 20-2, ..., 20-N.

Figure 2:
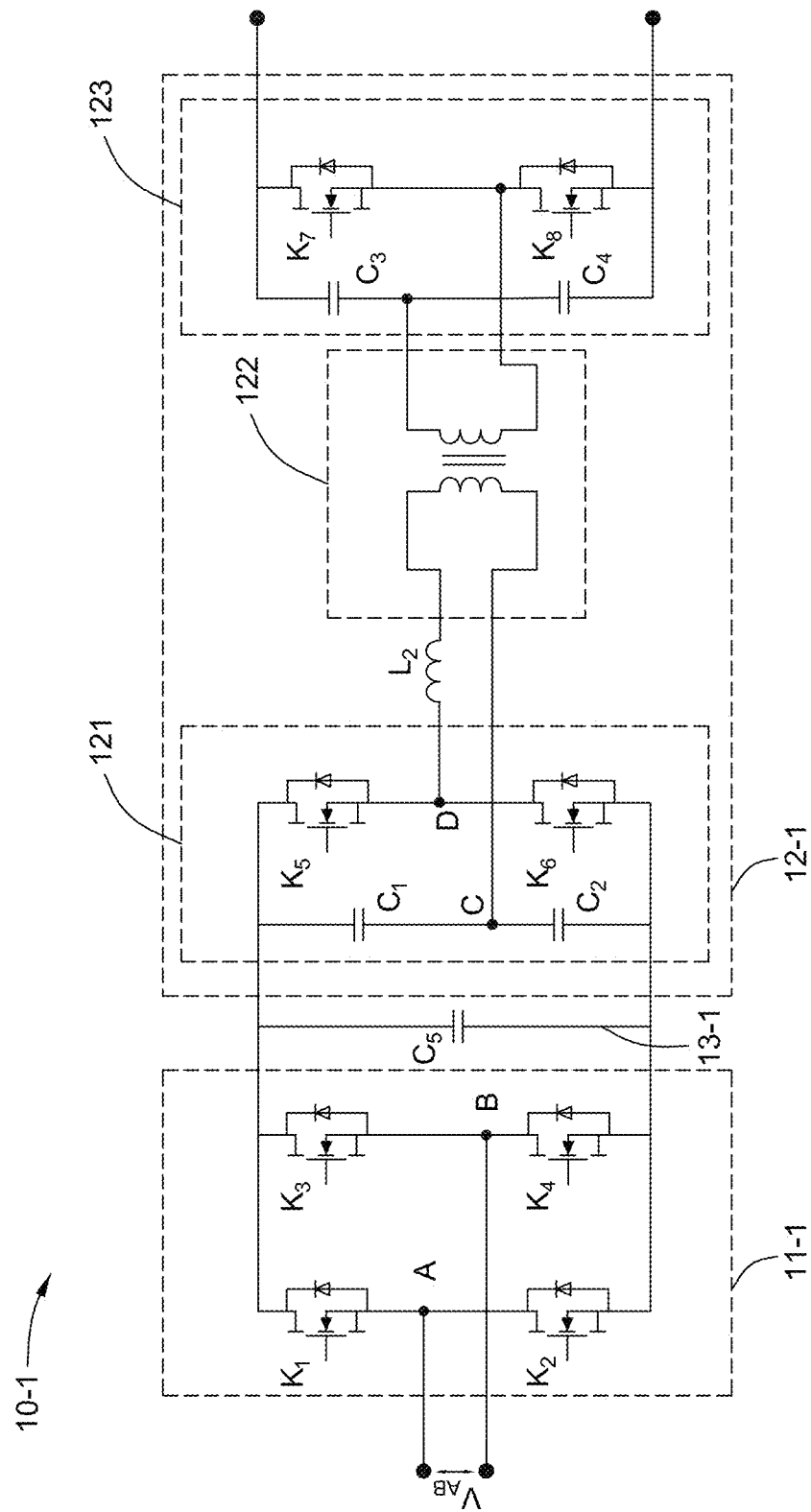
FIG. 2 is a circuit schematic diagram of a charging assembly in accordance with an embodiment of the present disclosure.

Please refer to FIG. 2. FIG. 2 illustrates a circuit schematic diagram of the charging assembly 10-1. The charging assembly 10-1 comprises the AC/DC converter 11-1 and the DC/DC converter 12-1.

The AC/DC converter 11-1 comprises two bridge arms, wherein one of the two bridge arms includes switching cells K1 and K2, and the other one includes switching cells K3 and K4. In some embodiments, switching cells K1, K2, K3 and K4 include FETs (field-effect tubes) and diodes, a gate of FET receives a drive signal and a drain and a source of FET are connected to two sides of the diode respectively.

The AC voltage is inputted to the AC/DC converter 11-1 through a connection point A of switching cells $K_1$ and $K_2$ and a connection point B of switching cells $K_3$ and $K_4$. In some embodiments, in the charging mode, the switching cells $K_1$, $K_2$, $K_3$ and $K_4$ of the AC/DC converter 11-1 is controlled by the dive signal to switch on and switch off, so as to convert the inputted AC voltage to the first DC voltage. In some embodiments, in the sleeping mode, the switching cells $K_1$ and $K_3$ are switch on and the $K_2$ and $K_4$ are switch off, or the switching cells $K_2$ and $K_4$ are switch on and the $K_1$ and $K_3$ are switch off.

The DC/DC converter 12-1 comprises a first converter 121, a transform module 122 and a second converter 123.

The first converter 121 is coupled to the AC/DC converter 11-1 and converts the first DC voltage generated by the AC/DC converter 11-1 to a first AC square wave. In some embodiments, a DC link 13-1 is coupled between the first converter 121 and the AC/DC converter 11-1. In some embodiments, the DC link 13-1 comprises a capacitor $C_5$ parallelly connected with two bridge arms of the AC/DC converter 11-1.

The first converter 121 comprises a half bridge circuit, the half bridge circuit includes switching cells $K_5$ and $K_6$. In some embodiments, the switching cells $K_5$ and $K_6$ include FETs and diodes, the gate of FET receives the drive signal and the drain and the source of FET are connected to two sides of the diode respectively. The switching cells $K_5$ and $K_6$ of the first converter 121 are controlled by the dive signal to switch on and switch off, so as to convert the first DC voltage from the AC/DC converter 11-1 to the first AC square wave. In some embodiments, the first converter 121 comprises capacitors $C_1$ and $C_2$, one side of the capacitor $C_1$ connects with one side of the half bridge circuit, and the other side of the capacitor $C_1$ connects with the capacitor $C_2$; one side of the capacitor $C_2$ connects with the capacitor $C_1$, and the other side of the capacitor $C_2$ connects with the other side of the half bridge circuit.

The transform module 122 is coupled to the first converter 121 for converting the first AC square wave generated by the first converter 121 to a second AC square wave electrically isolated from the first AC square wave. In some embodiments, the amplitudes of the first AC square wave and the second AC square wave are different; in some embodiments, the pulse duty cycles of the first AC square wave and the second AC square wave are different.

The transform module 122 mainly comprises a transformer. In some embodiments, one side of a primary side of the transform module 122 connects with a connection point D of switching cells $K_5$ and $K_6$ of half bridge circuit through an inductor $L_2$, the other side of the primary side of the transform module 122 connects with a connection point C of capacitors $C_1$ and $C_2$, and the secondary side of the transform module 122 is coupled to the second converter 123.

The second converter 123 converts the second AC square wave generated by the transform module 122 to the second DC voltage for charging the battery cell 20-1.

The second converter 123 comprises a half bridge circuit including switching cells $K_7$ and $K_8$. In some embodiments, switching cells $K_7$ and $K_8$ include FETs and diodes, the gate of FET receives the drive signal and the source and the drain are connected to two sides of the diode. The switching cells $K_7$ and $K_8$ of the second converter 123 are controlled by dive signal to switch on and switch off, so as to convert the second AC square wave generated by the transform module 122 to the second DC voltage for charging the battery cell 20-1. In some embodiments, the second transform module 123 comprises capacitors $C_3$ and $C_4$, one side of the capacitor $C_3$ connects with one side of the half bridge circuit, and the other side of the capacitor $C_3$ connects with the capacitor $C_4$; one side of the capacitor $C_4$ connects with the capacitor $C_3$, and the other side of the capacitor $C_4$ connects with the other side of the half bridge circuit.

In some embodiments, the charging assemblies 10-1, 10-2, . . . , 10-N have the same or similar circuit structures, however, the parameters of the units in the charging assemblies 10-1, 10-2, . . . , 10-N (such as turns ratio and etc. of transformer, saturation drain current, pinch off voltage, turn-on voltage, low-frequency transconductance, interelectrode capacitance, breakdown potential and etc. of FET in the switching cell, forward voltage drop, reverse breakdown voltage, continuous current, switching speed, storage time, cutoff frequency, impedance, junction capacitance and etc. of diode in the switching cell, inductance, rated current, allowable variation, quality factor, distributive capacitance and etc. of the inductor, capacitance, rated voltage, insulation resistance, frequency characteristics, temperature-coefficient, dissipation factor and etc. of the capacitor) are different. In some embodiments, the charging assemblies 10-1, 10-2, . . . , 10-N may have different circuit structures, for example, in the charging assembly 10-1, the second converter 123 comprises the half bridge circuit, and in the charging assembly 10-2, the half bridge circuit of the corresponding second converter is replaced with a full bridge circuit.

In some embodiments, the charging device 80 further comprises a control assembly 30, and the control assembly 30 generates the drive signal of each switching cell to control each switching cell to switch on or switch off.

Figure 3:
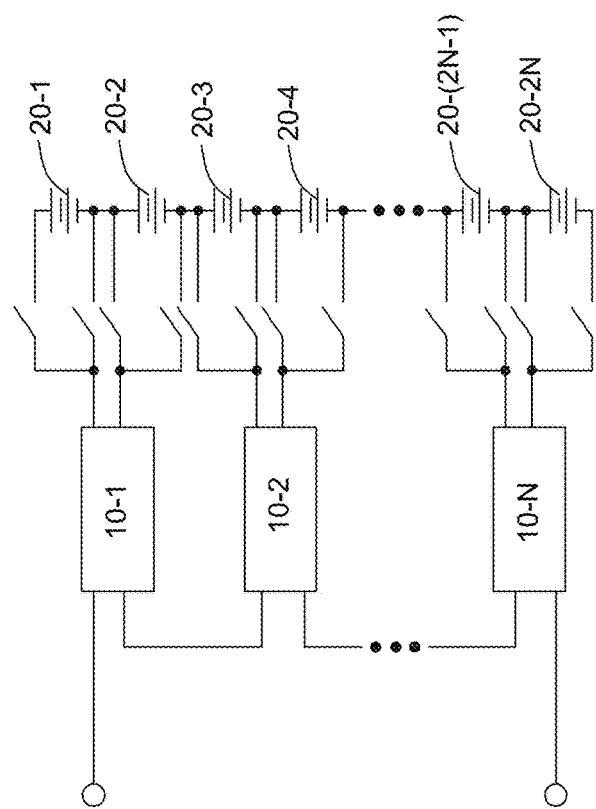
FIG. 3 is a circuit schematic diagram of the charging system in accordance with another embodiment of the present disclosure.

Please refer to FIG. 3. FIG. 3 illustrates a circuit schematic diagram of the charging system in accordance with another embodiment of the present disclosure. The main difference of the embodiments in accordance with FIG. 3 from the embodiments in accordance with FIG. 1 comprises that a quantity of battery cells in the battery pack is twice that of charging assemblies in the battery pack, and each of the charging assemblies is coupled to one of the two battery cells that neighbor with each other through a switch at a time. The configurations of the charging assemblies 10-1, 10-2, . . . , 10-N in the embodiments in accordance with FIG. 3 are the same or similar to the configurations of the charging assemblies 10-1, 10-2, . . . , 10-N in the embodiments in accordance with FIG. 1 and are not detailed herein.

In the embodiments in accordance with FIG. 3, the battery cells 20-1, 20-2, . . . , 20-2N in the battery pack may comprise two sets; wherein a first set comprises battery cells 20-1, 20-3, . . . , 20-(2N−1) and a second set comprises battery cells 20-2, 20-4, . . . , 20-2N. Through controlling the switch on and switch off of the switches between charging assemblies and batter cells, all the charging assemblies 10-1, 10-2, . . . , 10-N are connected to the first set of battery cells in the first time period, e.g., the charging assembly 10-1 is connected to the charging cell 20-1, the charging assembly 10-2 is connected to the charging cell 20-3, . . . , the charging assembly 10-N is connected to the charging cell 20-(2N−1), so that the charging assemblies 10-1, 10-2, . . . , 10-N charge the first set of battery cells 20-1, 20-3, . . . , 20-(2N−1) in the first time period; in the second time period, all the charging assemblies 10-1, 10-2, . . . , 10-N are connected to the second set of battery cells, e.g., the charging assembly 10-1 is connected to the charging cell 20-2, the charging assembly 10-2 is connected to the charging cell 20-4, . . . , the charging assembly 10-N is connected to the charging cell 20-2N, so that the charging assemblies 10-1, 10-2, . . . , 10-N charge the second set of battery cells 20-2, 20-4, . . . , 20-2N in the second time period.

The present embodiments utilize less charging assemblies to charge the battery cells.

Figure 4:
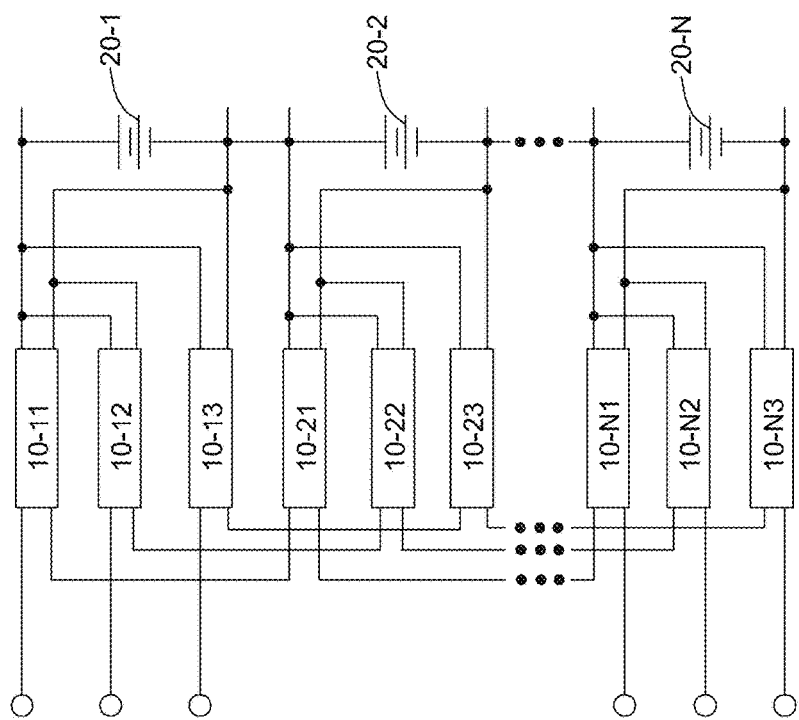
FIG. 4 is a circuit schematic diagram of the charging system in accordance with a further embodiment of the present disclosure.

Please refer to FIG. 4. FIG. 4 illustrates a circuit schematic diagram of the charging system in accordance with a further embodiment of the present disclosure. The main difference of the embodiments in accordance with FIG. 4 from the embodiments in accordance with FIG. 1 comprises that one charging unit may be charged by three charging assemblies, and input ends of the three charging assemblies receives three-phase currents of three-phase alternating current respectively. The configurations of charging assemblies 10-11, 10-12, 10-13, 10-21, 10-22, 10-23, . . . , 10-N1, 10-N2, 10-N3 in the embodiments in accordance with FIG. 4 are the same or similar to the configurations of charging assemblies 10-1, 10-2, . . . , 10-N in the embodiments in accordance with FIG. 1.

The input ends of the charging assemblies 10-11, 10-12, 10-13 receive the three-phase currents of three-phase alternating current respectively and output ends of the charging assemblies 10-11, 10-12, 10-13 are paralleled with each other and connect with the battery cell 20-1, so as to charge the battery cell 20-1; the input ends of the charging assemblies 10-21, 10-22, 10-23 receive the three-phase currents of three-phase alternating current respectively and output ends of the charging assemblies 10-21, 10-22, 10-23 are paralleled with each other and connect with the battery cell 20-2, so as to charge the battery cell 20-2; similarly, the input ends of the charging assemblies 10-N1, 10-N2, 10-N3 receive the three-phase currents of three-phase alternating current respectively and output ends of the charging assemblies 10-N1, 10-N2, 10-N3 are paralleled with each other and connect with the battery cell 20-N, so as to charge the battery cell 20-N.

The input ends of the charging assemblies 10-N1, 10-N2, 10-N3 are in series with each other to share a voltage of one phase from the three-phase alternating current; similarly, the input ends of the charging assemblies 10-12, 10-22, . . . , 10-N2 are in series with each other and the input ends of the charging assemblies 10-13, 10-23, . . . , 10-N3 are in series with each other.

In some embodiments, battery cells 20-1, 20-2, . . . , 20-N comprise a first set of battery cells 20-1, 20-3, . . . , 20-(N−1) and a second set of battery cells 20-2, 20-4, . . . , 20-N. The charging assemblies 10-11, 10-12, 10-13, 10-31, 10-32, 10-33, . . . , 10-[(N−1)1], 10-[(N−1)2], 10-[(N−1)3] connected with the first set of battery cells work in the charging mode in the first time period and work in the sleeping mode in the second time period; the charging assemblies 10-21, 10-22, 10-23, 10-41, 10-42, 10-43, . . . , 10-N1, 10-N2, 10-N3 connected with the second set of battery cells work in the sleeping mode in the first time period and work in the charging mode in the second time period.

The embodiments in accordance with FIG. 4 are capable of utilizing the three-phase alternating current to charge the battery cells respectively.

It should be noted that the embodiments in accordance with FIG. 2 may be modified to utilize the three-phase alternating current for charging.

In the embodiments in accordance with the present disclosure, each battery cell in the battery pack 70 is charged by corresponding charging assembly. Therefore, the charge of each battery cell may be controlled independently to achieve a better charge effect for each battery cell.

Usually, an infinite increase of the quantity of the charging assemblies is incapable, therefore, there is a difference between the waveform of the AC voltage generated by the switch on and off of the switching cells (e.g., $V_{in}$ shown in FIG. 1) and the waveform of the AC voltage in the power grid (e.g., $V_{grid}$ shown in FIG. 1) and generates harmonics. These harmonics may be feedback to the power grid and influence the power supply quality of the power grid.

Figure 5:
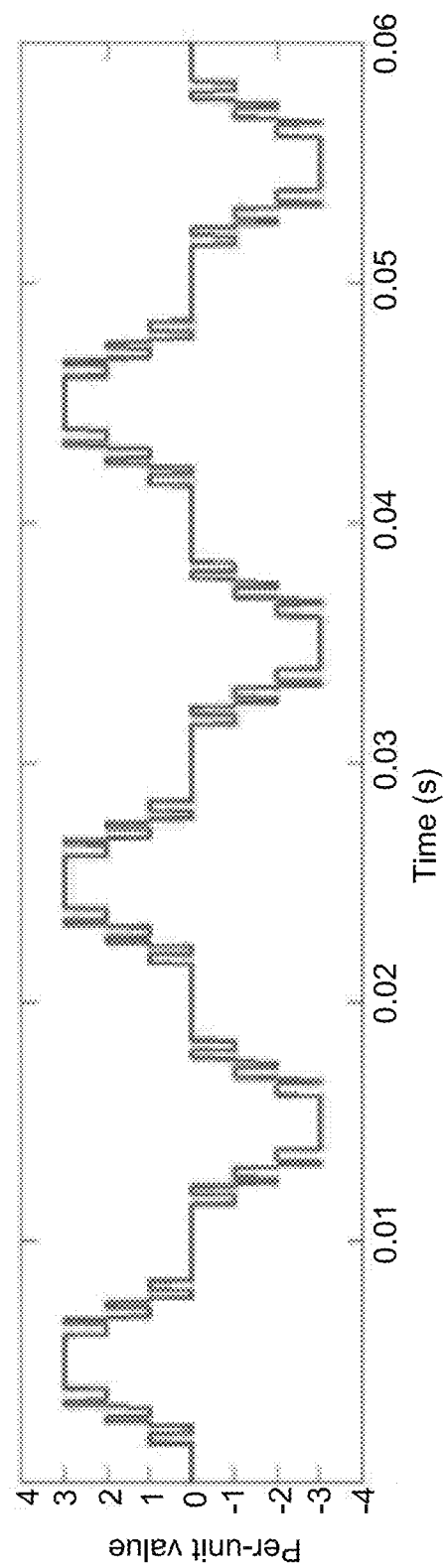
FIG. 5 is a schematic diagram of the waveform $V_{in}$ shown in FIG. 1.

If take the embodiments in accordance with FIG. 1 as examples, assuming the quantities of the charging assemblies in the charging mode in the first time period and in the second time period are both three, a schematic diagram of waveform of the AC voltage $V_{in}$ is shown in FIG. 5. The abscissa in FIG. 5 indicates time (second) and the ordinate indicates per-unit values between a maximum of a sum of the input voltage of all the charging assemblies in the charging mode and the voltage $V_{in}$ (hereinafter referred as to "per-unit values"). As N=3, the amplitude of the waveform shown in FIG. 5 may be indicated by six magnitudes, wherein the per-unit value "1" or "−1" indicates that the input voltage of the input end of one of the three charging assemblies is not zero, the per-unit value "2" or "−2" indicates that the input voltage of the input end of two of the three charging assemblies is not zero and the input voltage of the input end of the other one of the three charging assemblies is zero, and the per-unit value "3" or "−3" indicates that the input voltage of the input end of all of the three charging assemblies is not zero.

Contents of harmonics with different orders may be obtained by performing a Fourier spectrum analysis based on the waveform shown in FIG. 5, wherein the "content" of harmonic indicates the amplitude of the harmonic as a percentage of the amplitude of fundamental wave. Usually, the waveform shown in FIG. 5, i.e., the waveform of the voltage $V_{in}$, generates a plurality of harmonics.

The harmonics of the AC voltage $V_{in}$ may be reduced through configuring the drive signal of the switching cells of the AC/DC converters of the charging assemblies. In some embodiments, the drive signal of the switching cell may be configured based on the quantity of the charging assemblies in the charging mode and pre-determined order(s) of harmonic(s).

In the situation that one battery cell is charged by one charging assembly, the configuration of the drive signal of the switching cell is introduced based on the embodiments in accordance with FIGS. 1-3.

Since the waveforms of drive signals of switching cells in the plurality of AC/DC converters 11-1, 11-2, . . . , 11-N are close to each other, and since once the drive signal of the switching cell in one AC/DC converter is obtained, the drive signals of switching cells of the rest AC/DC converters may be determined based on a pre-determined phase difference (the pre-determined phase difference may be 2π/Z if the quantity of battery cells charged by charging assemblies in the charging mode in a time period is Z), the configuration of drive signals of switching cells $K_1$, $K_2$, $K_3$ 和 $K_4$ in the AC/DC converter 11-1 are mainly introduced hereinafter.

In some embodiments, the number of times of change of a potential difference $V_{AB}$ between a connection point A and a connection point B during the first quarter of one time period of the switching cells $K_1$, $K_2$, $K_3$ and $K_4$ is the same as the quantity of the charging assemblies in the charging mode, then combining the pre-determined order(s) of harmonic(s) desired to be reduced, phase angles at which the potential difference $V_{AB}$ changes during the first quarter may be determined, so that the waveform of the potential difference $V_{AB}$ during the first quarter is therefore determined; and, the waveform of the potential difference $V_{AB}$ during second, third and fourth quarters of one time period may be determined based on the waveform during the first quarter of the time period.

Figure 6:
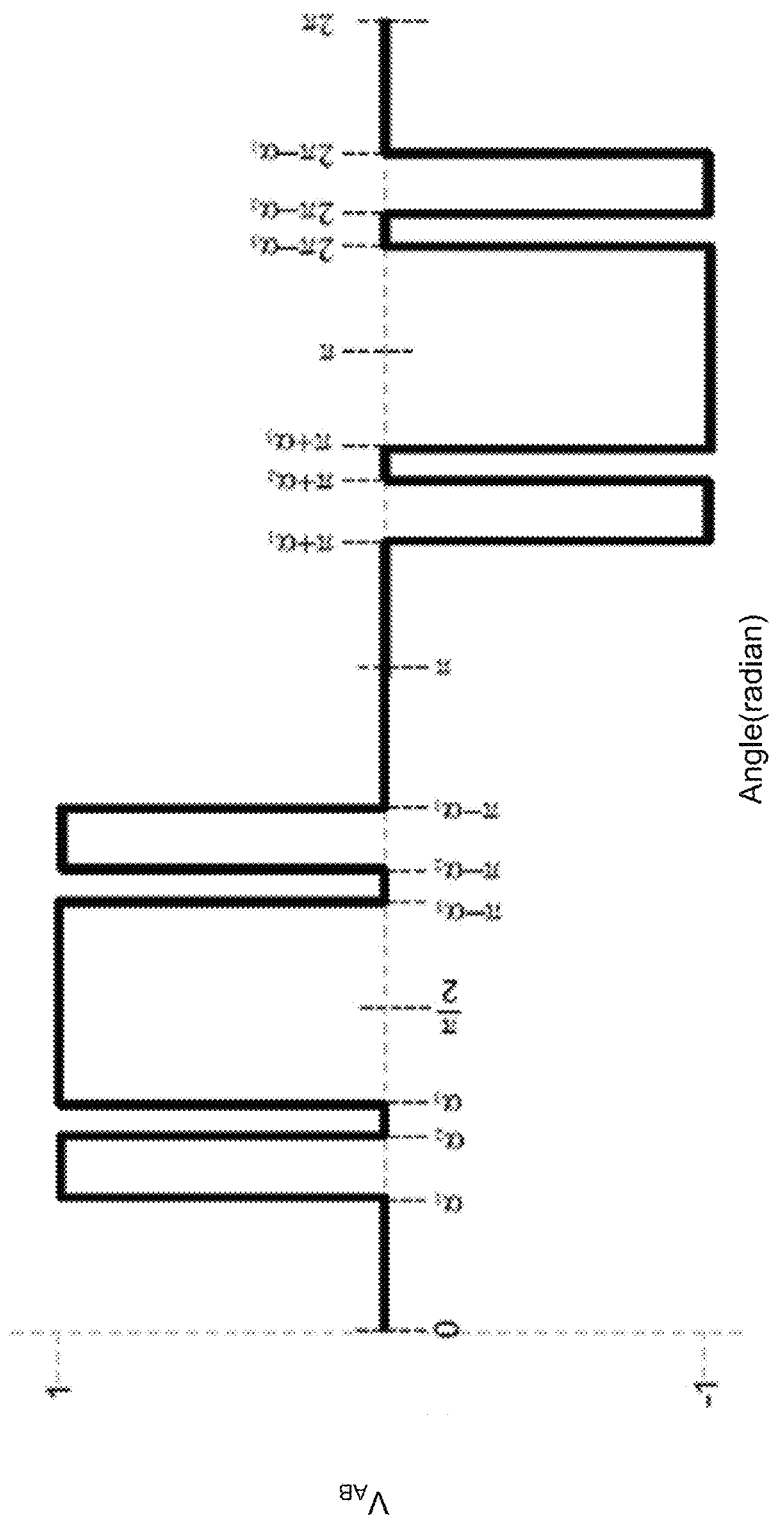
FIG. 6 is a schematic diagram of a waveform of $V_{AB}$ shown in FIG. 2 during a clock cycle of a switch unit.

FIG. 6 illustrates a schematic diagram of waveform of $V_{AB}$ during one time period of switching cells $K_1$, $K_2$, $K_3$ and $K_4$ of the AC/DC converter 11-1 when the charging assembly 10-1 is in the charging mode and the quantities of charging assemblies in the charging mode in the first time period and in the second time period are both three. The abscissa in FIG. 6 indicates angle (radian) and the ordinate indicates a normalized magnitude of $V_{AB}$. When $K_1$ and $K_4$ are switch on, and $K_2$ and $K_3$ are switch off, $V_{AB}=1$; when $K_2$ and $K_3$ are switch on, and $K_1$ and $K_4$ are switch off, $V_{AB}=-1$; when $K_1$ and $K_3$ are switch on and $K_2$ and $K_4$ are switch off, or when $K_1$ and $K_3$ are switch off and $K_2$ and $K_4$ are switch on, $V_{AB}=1$.

In FIGS. 6, $\alpha_1$, $\alpha_2$ and $\alpha_3$ indicate the phase angles at which $V_{AB}$ changes for the first time, the second time and the third time during the first quarter of one time period of switching cells $K_1$, $K_2$, $K_3$ and $K_4$; $\pi-\alpha_3$, $\pi-\alpha_2$ and $\pi-\alpha_1$ indicate the phase angles at which $V_{AB}$ changes for the first time, the second time and the third time during the second quarter of one time period of switching cells $K_1$, $K_2$, $K_3$ and $K_4$; $\pi+\alpha_1$, $\pi+\alpha_2$ and $\pi+\alpha_3$ indicate the phase angles at which $V_{AB}$ changes for the first time, the second time and the third time during the third quarter of one time period of switching cells $K_1$, $K_2$, $K_3$ and $K_4$; $2\pi-\alpha_3$, $2\pi-\alpha_2$ and $2\pi-\alpha_1$ indicate the phase angles at which $V_{AB}$ changes for the first time, the second time and the third time during the fourth quarter of one time period of switching cells $K_1$, $K_2$, $K_3$ and $K_4$.

The $\alpha_1$, $\alpha_2$ and $\alpha_3$ may be configured based on the pre-determined order(s) of harmonic(s) desired to be reduced. For example, an amplitude $b_n$ of the harmonic with an order "n" may satisfy the following formula based on a Fourier expansion of the waveform shown in FIG. 5.

$$b_n = \frac{4}{n\pi} \sum_{i=1}^{M} (-1)^{(i+1)} \cos(n\alpha_i)$$

Wherein, M indicates the quantity of charging assemblies in the charging mode, $\alpha_i$ indicates the phase angle at which $V_{AB}$ changes for the $i_{th}$ time during the first quarter of the time period of switching cells $K_1$, $K_2$, $K_3$ and $K_4$.

If orders of harmonics desired to be reduced are five and seven, $b_5$ may be set to zero and $b_7$ may be set to zero. Then the following formulas may be obtained based on the abovementioned formula.

$0 = \cos 5\alpha_1 - \cos 5\alpha_2 + \cos 5\alpha_3$      (1)

$0 = \cos 7\alpha_1 - \cos 7\alpha_2 + \cos 7\alpha_3$      (2)

Furthermore, the following formula is also obtained as an amplitude of fundamental wave is usually known.

$b_0 = \cos \alpha_1 - \cos \alpha_2 + \cos \alpha_3$      (3)

Wherein, $b_0$ indicates the amplitude of fundamental wave of the input end of the charging assembly 10-1.

The $\alpha_1$, $\alpha_2$ and $\alpha_3$ are obtained by solving the formulas (1), (2) and (3), i.e., the waveform of $V_{AB}$ during one time period is determined. Then, the drive signals of switching cells $K_1$, $K_2$, $K_3$ and $K_4$ may be configured so that the switch on and off of the switching cells $K_1$, $K_2$, $K_3$ and $K_4$ may generate the determined waveform of $V_{AB}$.

The following table 1 examples the content of harmonic with the order "n" of AC voltage $V_{in}$ obtained by configuring the drive signals of switching cells based on manners introduced in accordance with FIGS. 1-3 and 6, wherein the orders of harmonics desired to be reduced are five and seven and n=1, 3, 5, 7, 9, 11, 15, 21, 23, 25.

TABLE 1

| Order of Harmonic | Content of Harmonic |
|---|---|
| 1 | 1 |
| 3 | 0.38 |

TABLE 1-continued

| Order of Harmonic | Content of Harmonic |
|---|---|
| 5 | 0.0012 |
| 7 | 0.004 |
| 9 | 0.095 |
| 11 | 0.0012 |
| 15 | 0.21 |
| 21 | 0.287 |
| 23 | 0.256 |
| 25 | 0.281 |

As shown in accordance with table 1, the contents of harmonics with the orders five and seven are less than the contents of other harmonics.

In the situation that one battery cell is charged by three charging assemblies, the configuration of the drive signal of the switching cell is introduced based on the embodiments in accordance with FIG. 4.

In the present embodiments, N=6, the battery pack comprises six battery cells 20-1, 20-2, 20-3, 20-4, 20-5 and 20-6; battery cell 20-1 is charged by charging assemblies 10-11, 10-12, 10-13; battery cell 20-2 is charged by charging assemblies 10-21, 10-22, 10-23; similarly, battery cell 20-6 is charged by charging assemblies 10-61, 10-62, 10-63.

The first set of battery cells comprises 20-1, 20-3 and 20-5, and the second set of battery cells comprises 20-2, 20-4 and 20-6, therefore, the quantity of charging assemblies in the charging mode is nine at a time. And, in the first time period, the charging assemblies in the charging mode comprise 10-11, 10-12, 10-13, 10-31, 10-32, 10-33, 10-51, 10-52, 10-53, and in the second time period, the charging assemblies in the charging mode comprise 10-21, 10-22, 10-23, 10-41, 10-42, 10-43, 10-61, 10-62, 10-63.

As the configuration of the drive signals of switching cells in the AC/DC converters of the charging assemblies in the charging mode in the first time period is the same or similar to the configuration of the drive signals of switching cells in the AC/DC converters of the charging assemblies in the charging mode in the second time period, and as the configurations of the drive signals of the switching cells in the AC/DC converters of the charging assemblies for charging the same battery cell are the same, configurations of the drive signals of the switching cells in the AC/DC converters of charging assemblies 10-11, 10-31, 10-51 are mainly introduced.

Please refer to FIG. 2, FIG. 4 and FIG. 6. Circuit configurations of the charging assemblies 10-11, 10-12 and 10-13 are the same as the circuit configuration of the charging assembly 10-1; similarly, the drive signals of the switching cells in the AC/DC converters of the charging assemblies 10-11, 10-12 and 10-13 may also be determined based on the waveform of $V_{AB}$ shown in FIG. 2.

Phase angles at which the waveform of $V_{AB}$ corresponding to the charging assembly 10-11 changes for the first, the second and the third time during the first quarter of the time period of switching cells are indicated as $\alpha_1$, $\alpha_2$ and $\alpha_3$; phase angles at which the waveform of $V_{AB}$ corresponding to the charging assembly 10-31 changes for the first, the second and the third time during the first quarter of the time period of switching cells are indicated as $\alpha_4$, $\alpha_5$ and $\alpha_6$; phase angles at which the waveform of $V_{AB}$ corresponding to the charging assembly 10-51 changes for the first, the second and the third time during the first quarter of the time period of switching cells are indicated as $\alpha_7$, $\alpha_8$ and $\alpha_9$. The $\alpha_1$-$\alpha_9$ may be obtained based on the following formulas:

$$\sum_{i=1}^{3}(-1)^{(i+1)}\cos\alpha_i = \lambda_1 \quad (4)$$

$$\sum_{i=4}^{6}(-1)^{i}\cos\alpha_i = \lambda_2 \quad (5)$$

$$\sum_{i=7}^{9}(-1)^{(i+1)}\cos\alpha_i = \lambda_3 \quad (6)$$

$$\sum_{i=1}^{3}(-1)^{(i+1)}\cos n\alpha_i + \sum_{i=4}^{6}(-1)^{i}\cos n\alpha_i + \sum_{i=7}^{9}(-1)^{(i+1)}\cos n\alpha_i = 0 \quad (7)$$

Wherein, $\lambda_1$ indicates a ratio between the fundamental wave amplitude of an alternating current inputted to the input end of AC/DC converter of the charging assembly 10-11 and the first DC voltage outputted by the AC/DC converter of the charging assembly 10-11; $\lambda_2$ indicates a ratio between the fundamental wave amplitude of an alternating current inputted to the input end of AC/DC converter of the charging assembly 10-31 and the first DC voltage outputted by the AC/DC converter of the charging assembly 10-31; $\lambda_3$ indicates a ratio between the fundamental wave amplitude of an alternating current inputted to the input end of AC/DC converter of the charging assembly 10-51 and the first DC voltage outputted by the AC/DC converter of the charging assembly 10-51; "n" indicates the order of the harmonic desired to be reduced. In some embodiments, n=5, 7, 11, 13, 17, 19.

The $\alpha_1$-$\alpha_9$ may be determined by solving the abovementioned formulas (4)-(7), so that the drive signals of the switching cells in the AC/DC converters of the charging assemblies 10-11, 10-31 and 10-51 may be determined.

In some situations, the input voltages between the input ends of the charging assemblies may be unbalance, which may lead to a lot of problems, e.g., a charging unbalance between the charging assemblies. Therefore, the drive signals of the switching cells of the AC/DC converters may be configurated based on the input voltages or output voltages of the charging assemblies in the charging mode, so as to adjust the unbalance in the charging process. Hereinafter, examples are introduced based on the embodiments in accordance with FIG. 3.

In the present examples, the quantity N of the charging assemblies is three, and the quantity M of the charging assemblies in the charging mode is also three. A pulse signal modulation degree $\lambda_i$ of switching cells of the AC/DC converter in the charging assembly 10-I may be obtained based on the following formula, wherein $\lambda_i$ indicates a ratio between the fundamental wave amplitude of an alternating current inputted to the input end of AC/DC converter of the charging assembly 10-$i$ and the first DC voltage outputted by the AC/DC converter of the charging assembly 10-$i$, and i=1, 2, ..., M.

$$\lambda_i = \lambda^* + \Delta\lambda_i$$

Wherein, $$\lambda^* = \frac{V_{total}}{E * M},$$

$V_{total}$ indicates a total voltage inputted to the charging assemblies 10-1, 10-2 and 10-3, and E indicates a total voltage outputted by the charging assemblies 10-1, 10-2 and 10-3; $\Delta\lambda_i$ may be determined based on ($E_i$-E/M), wherein $E_i$ indicates the output voltage of the charging assembly 10-$i$.

After obtaining the pulse signal modulation degree, the drive signals of the switching cells of the AC/DC converters may be determined correspondingly, therefore, the alternating voltages inputted into the charging assemblies are adjusted and the balance of voltages between the charging assemblies are better. And, since the unbalance of charge between battery cells may influence the alternating voltages inputted into the charging assemblies (e.g., if one battery cell is fully charged or almost fully charged faster than other battery cells, the voltage of DC link in the charging assembly for charging the battery cell may increase and lead to the increase of the input voltage of the charging assembly), the unbalance of charge between battery cells may be reduced through adjusting the input voltages of the charging assemblies.

Figure 7:
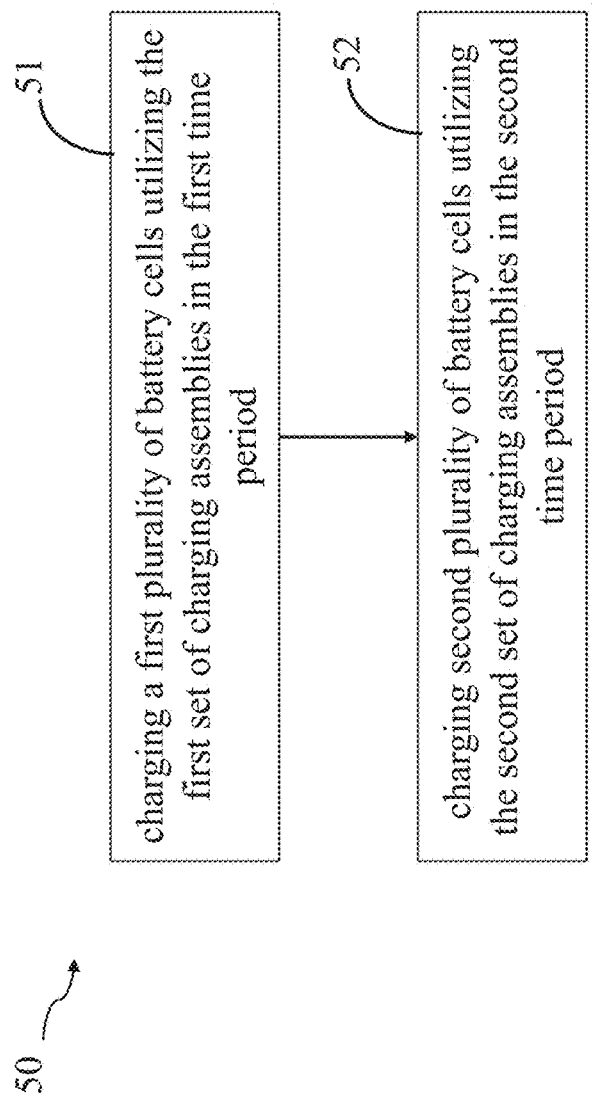
FIG. 7 is a schematic diagram of a charging method in accordance with an embodiment of the present disclosure.

FIG. 7 illustrates a schematic diagram of a charging method 50 for charging battery pack in accordance with an embodiment of the present disclosure. The battery pack comprises a plurality of battery cells connected electrically in series. The charging method comprises following steps 51 and 52.

In the step 51, the first set of the plurality of battery cells are charged through utilizing the first set of charging assemblies in the first time period.

In the step 52, the second set of the plurality of battery cells are charged through utilizing the second set of charging assemblies in second first time period.

In some embodiments, the configurations of the charging assemblies and the battery pack in the step 51 and the step 52 may be considered based on the embodiments in accordance with FIGS. 1-4. It should be noted that there is no sequence between the step 51 and the step 52.

Figure 8:
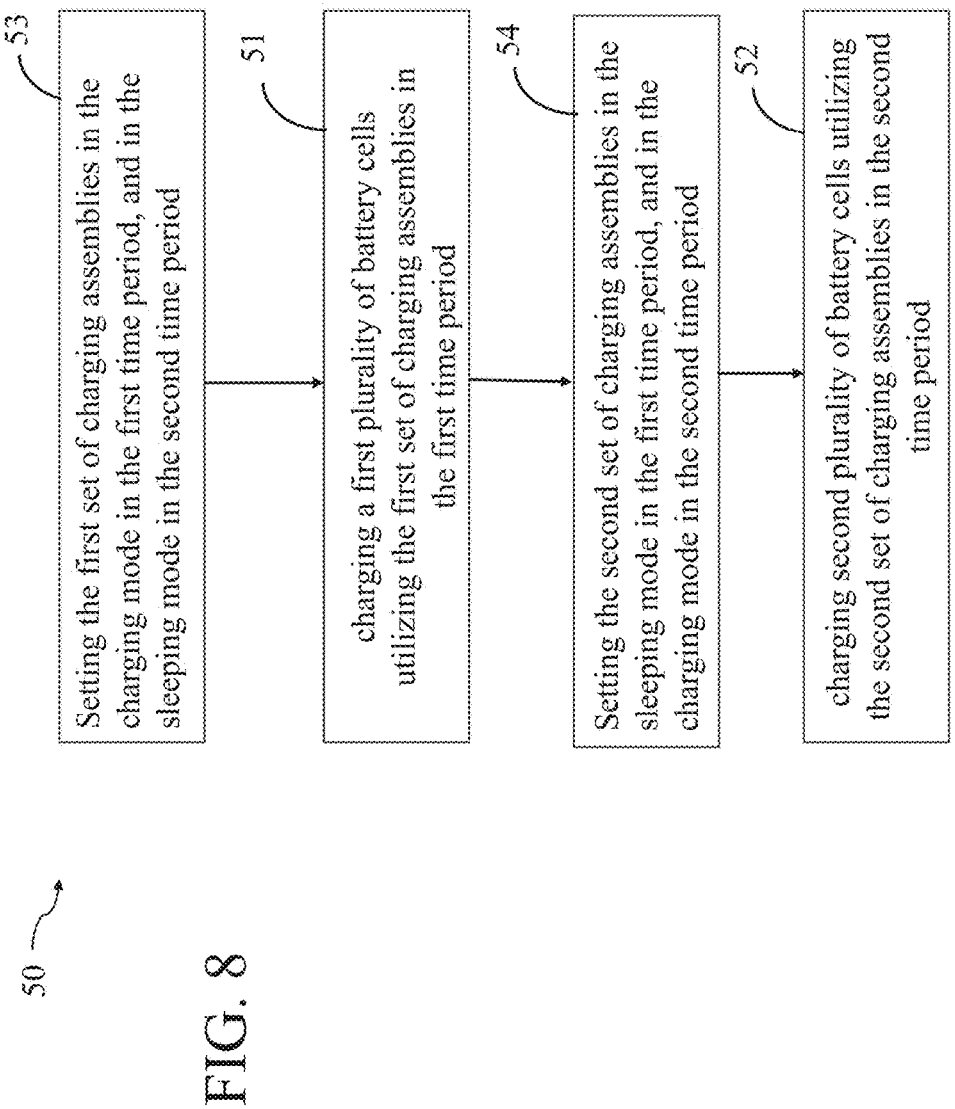
FIG. 8 is a schematic diagram of a charging method in accordance with another embodiment of the present disclosure.

In some embodiments, e.g., the embodiments in accordance with FIG. 8, the charging method 80 further comprises a step 53 and a step 54. In the step 53, the first set of charging assemblies are set in the charging mode in the first time period and are set in the sleeping mode in the second time period; in the step 54, the second set of charging assemblies are set in the sleeping mode in the first time period and are set in the charging mode in the second time period. The connection manner between the charging assemblies and the battery pack in accordance with the method illustrated by FIG. 8 may refer to the embodiments in accordance with FIGS. 1&4. It should be noted that the steps 51 and 53 may be performed simultaneously and the steps 52 and 54 may be performed simultaneously.

Figure 9:
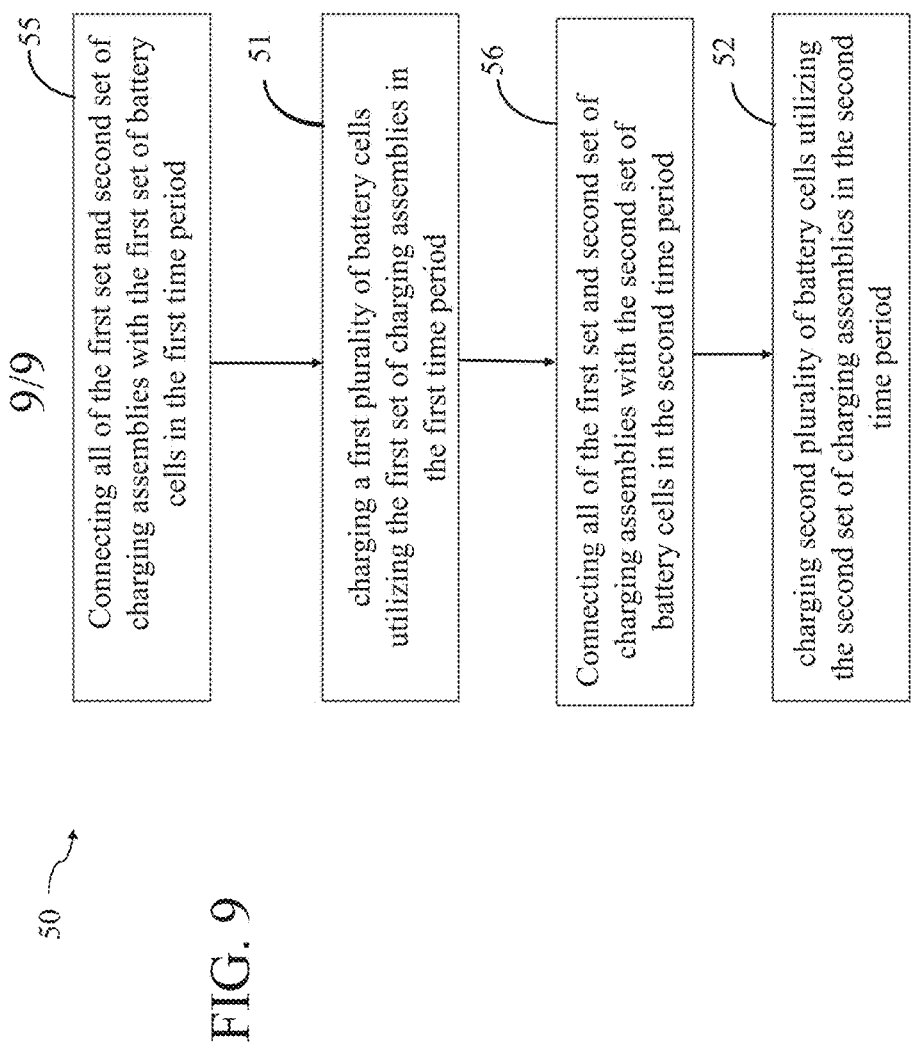
FIG. 9 is a circuit schematic diagram of a charging method in accordance with a further embodiment of the present disclosure.

In some embodiments, e.g., the embodiments in accordance with FIG. 9, the charging method 80 further comprises a step 55 and a step 56. In the step 55, all of the first set and second set of charging assemblies are connected with the first set of battery cells in the first time period; in the step 56, all of the first set and second set of charging assemblies are connected with the second set of battery cells in the second time period. The connection manner between the charging assemblies and the battery pack in accordance with the method illustrated by FIG. 9 may refer to the embodiments in accordance with FIG. 3. It should be noted that the steps 51 and 55 may be performed simultaneously and the steps 52 and 56 may be performed simultaneously.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A charging device for charging a battery pack, the battery pack including a plurality of batteries connected in series, the charging device comprising:
   a plurality of charging assemblies, each charging assembly comprising:
      a DC/DC converter for converting a first DC voltage to a second DC voltage for charging one or more batteries of the battery pack;
   the plurality of batteries comprising a first set of at least two batteries and a second set of at least two batteries, the batteries of the first set being alternately connected in series with the batteries of the second set;
   the plurality of charging assemblies being configured to charge the first set during a first time period and the second set during a second time period such that any two batteries that are adjacent to each other are charged during different time periods.

2. The charging device of claim 1, wherein:
   each of the plurality of charging assemblies is configured to connect with one battery;
   the charging assemblies for connecting with the first set of the plurality of batteries are in a charging mode during the first time period and in a sleeping mode during the second time period; and
   the charging assemblies for connecting with the second set of the plurality of batteries are in the sleeping mode during the first time period and in the charging mode during the second time period.

3. The charging device of claim 1, wherein all of the plurality of charging assemblies are configured to connect with the first set of the plurality of batteries during the first time period and connect with the second set of the plurality of batteries during the second time period.

4. The charging device of claim 1, wherein the DC/DC converter comprises:
   a first converter for converting the first DC voltage to a first AC square wave;
   a transform module for converting the first AC square wave to a second AC square wave electrically isolated from the first AC square wave; and
   a second converter for converting the second AC square wave to the second DC voltage.

5. The charging device of claim 1, wherein each charging assembly further comprises an AC/DC converter for converting an inputted AC voltage to the first DC voltage, the AC/DC converter comprising:
   a plurality of bridge arms;
   each of the plurality of bridge arms comprising a plurality of switching cells.

6. The charging device of claim 5, further comprising a control assembly configured to generate drive signals for the plurality of switching cells.

7. The charging device of claim 6, wherein the drive signals are generated based on an input voltage of the charging assemblies in a charging mode.

8. The charging device of claim 6, wherein the drive signals are generated based on a quantity of charging assemblies in a charging mode and a pre-determined harmonic order.

9. A charging system, comprising:
   a battery pack comprising a plurality of batteries connected in series, the plurality of batteries comprising a first set of at least two batteries and a second set of at least two batteries, the batteries of the first set being alternately connected in series with the batteries of the second set; and
   a charging device for charging the battery pack comprising a DC/DC converter for converting a first DC voltage to a second DC voltage for charging one or more batteries of the battery pack;
   the charging device being configured to charge the first set during a first time period and the second set during a second time period such that any two batteries that are adjacent to each other are charged during different time periods.

10. The charging system of claim 9, wherein:
    the charging device comprises a plurality of charging assemblies, each of the plurality of charging assemblies being configured to connect with one battery;
    the charging assemblies for connecting with the first set of the plurality of batteries are in a charging mode during the first time period and in a sleeping mode during the second time period; and
    the charging assemblies for connecting with the second set of the plurality of batteries are in the sleeping mode during the first time period and in the charging mode during the second time period.

11. The charging system of claim 9, wherein:
    the charging device comprises a plurality of charging assemblies; and
    all of the plurality of charging assemblies are configured to connect with the first set of the plurality of batteries during the first time period and connect with the second set of the plurality of batteries during the second time period.

12. The charging system of claim 9, wherein the DC/DC converter comprises:
    a first converter for converting the first DC voltage to a first AC square wave;
    a transform module for converting the first AC square wave to a second AC square wave electrically isolated from the first AC square wave; and
    a second converter for converting the second AC square wave to the second DC voltage.

13. The charging system of claim 9, wherein the charging device further comprises an AC/DC converter for converting an inputted AC voltage to the first DC voltage, the AC/DC converter comprising:
    a plurality of bridge arms;
    each of the plurality of bridge arms comprising a plurality of switching cells.

14. The charging system of claim 13, further comprising a control assembly configured to generate drive signals for the plurality of switching cells.

15. The charging system of claim 14, wherein the drive signals are generated based on an input voltage of the charging assemblies in a charging mode.

16. The charging system of claim 14, wherein the drive signals are generated based on a quantity of charging assemblies in a charging mode and a pre-determined harmonic order.

17. A method for charging a plurality of batteries, the plurality of batteries including a first set of at least two batteries and a second set of at least two batteries, the batteries of the first set being alternately connected in series with the batteries of the second set, the method comprising:
    charging the first set of the plurality of batteries by a first set of charging assemblies during a first time period; and charging the second set of the plurality of batteries by a second set of charging assemblies during a second time period;

wherein any two batteries of the plurality of batteries that are adjacent to each other are charged during different time periods.

18. The charging method of claim 17, further comprising:

setting the first set of charging assemblies in a charging mode during the first time period and in a sleeping mode during the second time period; and setting the second set of charging assemblies in the sleeping mode during the first time period and in the charging mode during the second time period.

19. The charging method of claim 17, further comprising:

connecting all of the first and second set of charging assemblies with the first set of the plurality of batteries during the first time period; and connecting all of the first and second set of charging assemblies with the second set of the plurality of batteries during the second time period.

* * * * *